May 26, 1925.
B. W. KING
PROJECTION DEVICE
Filed Feb. 20, 1922
1,538,943
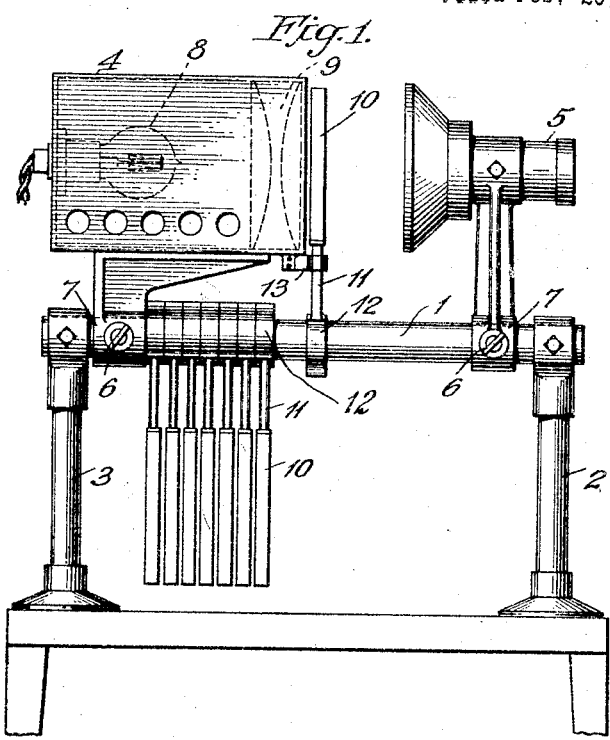
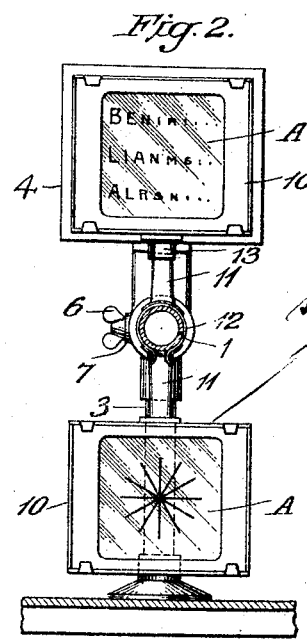
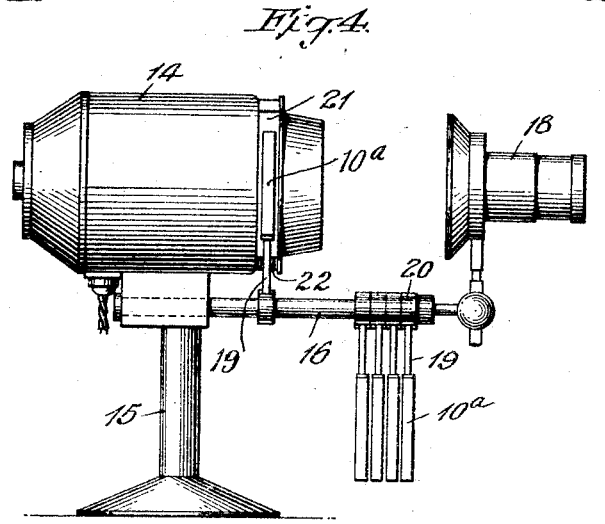
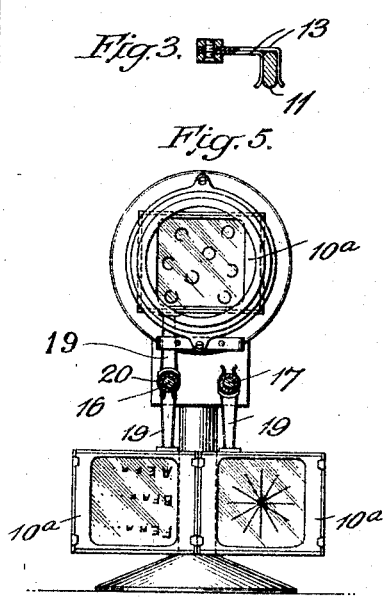
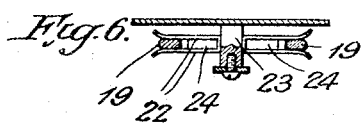
Inventor
Burnham W. King
By his Attorneys
Stockbridge & Borst.

Patented May 26, 1925.

1,538,943

UNITED STATES PATENT OFFICE.

BURNHAM W. KING, OF EAST ORANGE, NEW JERSEY, ASSIGNOR TO JULIUS KING OPTICAL COMPANY, A CORPORATION OF NEW YORK.

PROJECTION DEVICE.

Application filed February 20, 1922. Serial No. 537,831.

*To all whom it may concern:*

Be it known that I, BURNHAM W. KING, a citizen of the United States, residing at East Orange, in the county of Essex and State of New Jersey, have invented certain new and useful Improvements in Projection Devices, of which the following is a full, clear, and exact description.

This invention relates to the art of optical projection, and particularly to the stereopticon type of projecting devices. In the examination of eyes, suitable charts are utilized which display various characters, lines, figures or other representations at a known distance from the patient, the reading of these charts by the patient both with the natural eye and with various test lenses serving to indicate to the examiner the nature and amount of correction required.

An object of this invention is to provide an improved projection device with which images or shadows of any desired charts, symbols, or representations that may be found useful in eye examinations may be projected upon a wall or screen at any desired or variable size, at a known distance from the patient, and in any desired order of sequence; with which the charts, symbols or representations may be easily and quickly interchanged and replaced with others, and with which the examiner may illustrate to the patient in an interesting and effective manner various defects of vision, eye diseases, types of eye glasses and frames, and the appearance of various types of frames and eye glasses on persons with different features. A further object is to provide a device for accomplishing these objects which has a maximum possible simplicity in construction, adjustment and manipulation, and which is attractive in appearance, inexpensive, compact and durable.

Other objects and advantages will be apparent from the following description of embodiments of the invention, and the novel features will be particularly pointed out in claims.

In the accompanying drawing:

Fig. 1 is a side elevation of a stereopticon constructed in accordance with this invention;

Fig. 2 is a sectional elevation of the same taken transversely of the device between the adjustable sections thereof;

Fig. 3 is a sectional plan of the carrier holding means;

Fig. 4 is a side elevation of a slightly modified stereopticon constructed in accordance with my invention;

Fig. 5 is a transverse section of the same taken substantially between the adjustable sections thereof; and Fig. 6 is a sectional plan of the carrier holding means of the same.

In the embodiment illustrated in Figs. 1 to 3, a rod 1 is mounted between spaced standards 2 and 3 to form supporting means for the sections 4 and 5 of the projecting mechanism. These sections 4 and 5 are adjustable along the rod 1 to provide the necessary focusing of the image upon the screen and are each secured in adjusted positions therealong by suitable clamping means 6 carried by the bearings 7 of the sections. The section 4 of the projecting mechanism contains a source of illumination 8 adapted to throw rays of light through a condensing lens 9 upon a transparent plate or upon an object mounted within the carrier 10, the rays of light passing through the plate or object in the carrier 10 being focused upon the screen by the section 5. The section 5 may be of any suitable construction or have any suitable arrangement of lenses, and preferably is provided with lenses that are adjustable therein to secure the desired range of focusing upon the screen. The carriers 10 are each provided with a supporting stem 11 that terminates in a spring clamp 12 which is adapted to snap over and embrace the rod 1 so as to support the carriers for sliding movement along the same and also for rotary movement about the rod 1 as an axis. Each carrier is provided with a transparent plate or slide A having illustrated thereon suitable figures, letters, characters, reversed letters, animals, clock dials, radiating lines, foreign languages, symbols of various kinds, pictures illustrating various defects of vision and various conditions of eye diseases, and pictures of children or adults wearing glasses mounted in different types of frames. The letters, symbols, lines, etc. may be those commonly employed in the examination of eyes such as the standard Snellen test type which are used for testing eyes at a given distance from the chart. These letters, type, lines, etc., are of various sizes and by means of the projecting mechanism an image of the same may be projected upon a screen at a given distance and focused thereon to the desired size. The carriers may be adjusted along the rod 1 so as to bring any carrier opposite the space between the sections of the projecting mechanism and the carriers may then be rotated individually into an upright position so as to carry the transparent plate or slide into projecting position within the line of projection between the sections of the projecting mechanism. A pair of spring fingers 13 are suitably clamped to the bottom of the section 4 of the projecting mechanism and have spaced terminals that extend in substantially parallel relation to one another and transversely of the mechanism so as to receive and embrace the stem 11 of an object carrier when the latter is moved into projecting position between the sections and yieldingly hold the carrier in that position. By adjusting the carriers along the rod 1 any desired carrier may be brought into a position from which it may be swung into projecting position and any and all of the carriers may be quickly removed from the rod 1 and rearranged or reapplied thereto, the spring clamp permitting the attachment or removal of the carriers by the mere act of pulling or pushing the same therefrom or thereon. The carriers may, therefore, be arranged for projection, in any desired or given order, of the representations carried by the transparent plates thereof, and the order may be quickly varied as desired.

In the embodiment illustrated in Figs. 4 to 6 the section 14 containing the source of illumination and the condensing lens is mounted upon a suitable standard 15, and a pair of spaced parallel rods 16 and 17 extend forwardly therefrom and carry at their forward end the focusing section 18 of the projecting mechanism. The object or plate carriers 10ª are attached by means of stems 19 and spring clamps 20 to one or both of the rods 16 and 17, so as to be slidable along the same, rotatable thereabout, and also detachable therefrom. The section 14 is provided with an opening 21 into which the carriers may be swung from each side into projecting position in the line of projection. Pairs of spring fingers 22 are secured to a boss 23 projecting from the section 14, the pairs of fingers extending in opposite directions and towards each side of the section 14. These pairs of fingers are adapted to receive the stems 19 of the carriers when the latter are swung up into projecting position and yieldingly hold the carriers in their effective projecting position. A stop block 24 is provided between each pair of fingers so as to prevent movement of each carrier past its proper projecting position when rotated into position.

In the use of the device, the carriers are provided with suitable plates or transparent pictures of the objects or representations the images of which are to be projected upon the screen and, if desired, actual objects may be mounted in the carriers for movement into the path of projection so as to have the shadows thereof cast upon the screen. The projecting device is focused in a well known manner, so as to provide the desired size of image upon the screen and so as to obtain a clearly defined image. The carriers may be applied to the supporting rod by springing the fingers of the clamp 12 or 20 over the supporting rods 1, 16 or 17 with the carriers arranged in any desired order thereon. The carriers are then adjusted along the supporting rod so as to bring any desired carrier into a position from which it may be swung up into projecting position with respect to or between the projecting sections. With this arrangement, the carriers may be shifted individually into projecting position in any desired order, and the carriers may be quickly removed, replaced or interchanged as occasion demands. By the use of the word "object," I intend to include either transparent plates carrying representations or actual objects, images of which are to be projected upon the screen.

It will be obvious that various other changes in the details and arrangement herein described and illustrated, may be made by those skilled in the art within the principle and scope of the invention.

Claims:—

1. In the art of optical projection, a projecting device having supporting means and two projecting sections relatively adjustable thereon, and a plurality of object carriers pivotally and slidably mounted on said supporting means whereby the carriers are adjustable along the supporting means to bring any individual carrier opposite the projecting position and permit this individual carrier to be then rotated into projecting position in the line of projection of the device.

2. In the art of optical projection, a projecting device having supporting means and two projecting sections relatively adjustable thereon, a plurality of object carriers pivotally and slidably mounted on said supporting means whereby the carriers are adjustable along the supporting means to bring any individual carrier opposite the projecting position and permit this individual carrier to be then rotated into projecting position in the line of projection of the device, and means for holding each carrier in projecting position when moved into that position.

3. In the art of optical projection, a projecting device having supporting means and two projecting sections relatively adjustable thereon, a plurality of object carriers pivotally and slidably mounted on said supporting means whereby the carriers are adjustable along the supporting means to bring any individual carrier opposite the projecting position and permit this individual carrier to be then rotated into projecting position in the line of projection of the device, and a catch device for engaging and resiliently holding each carrier in projecting position within the line of projection when moved into that position.

4. In the art of optical projection, a projecting device, a plurality of individual plate carriers, means mounting said carriers to enable the movement of said carriers individually into the line of projection of the device in any desired order of sequence, and a catch device for engaging and resiliently holding each carrer in projecting position within the line of projection of the device when said carriers are moved into said position.

5. In the art of optical projection, a projecting device having relatively adjustable sections, a rod by means of which one of the sections is adjustable relatively to the other, and a plurality of object carriers rotatably and slidably carried by said rod, whereby said carriers may be brought individually into projecting relation with respect to said sections in any variable order of sequence.

6. In the art of optical projection, a projecting device having relatively adjustable sections a pair of spaced parallel rods upon which one of the sections is supported, a plurality of object carriers slidably and rotatably carried by said rods, whereby the carriers may be adjusted along the rods and individually swung into projecting positions with respect to said sections from opposite sides and in any desired order of sequence.

7. In the art of optical projection, a projecting device having relatively adjustable sections, a pair of spaced paralled rods upon which one of the sections is supported, a plurality of object carriers each having a spring clamp for attachment of the same to one of the rods for sliding and rotary movement thereon whereby the carriers may be adjusted along the rods and individually swung into projecting positions with respect to said sections from opposite sides and in any desired order of sequence.

8. In the art of optical projection, projecting parts supporting means, a plurality of object carriers each having a spring clamp for attachment of the same to said means, said carriers being adjustable along said means to a point at which they may be individually shifted into projecting position with respect to said parts.

9. In the art of optical projection, a projecting device having relatively adjustable sections, a pair of spaced parallel rods upon which one of the sections is supported, a plurality of object carriers each having a spring clamp for attachment of the same to one of the rods for sliding and rotary movement thereon whereby the carriers may be adjusted along the rods, and individually swung into projecting position with respect to said sections from opposite sides and in any desired order of sequence, and spring clips to hold the desired carriers in an operative position.

10. In the art of optical projection, a projecting device having relatively adjustable sections, a pair of spaced parallel rods upon which one of the sections is supported, a plurality of object carriers each having a spring clamp for attachment of the same to one of the rods for sliding and rotary movement thereon whereby the carriers may be adjusted along the rods and individually swung into projecting position with respect to said sections from opposite sides and in any desired order of sequence, and diametrically opposed stationary spring clips for holding the individual carriers in projecting positions.

11. In the art of optical projection, a projecting device having supporting means and two projecting sections relatively adjustable thereon, a plurality of object carriers pivotally and slidably mounted on said supporting means whereby the carriers are adjustable along the supporting means to bring any individual carrier opposite the projecting position and to permit the individual carrier to be then rotated into projecting position in the line of projection of the device, and stationary means for holding the said individual carriers in an operative position.

12. In the art of optical projection, a projecting device having supporting means and two projecting sections relatively adjustable thereon, a plurality of object carriers pivotally and slidably mounted on said supporting means whereby the carriers are adjustable along the supporting means to bring any individual carrier opposite the projecting position and to permit the individual carrier to be then rotated into projecting position in the line of projection of the device, and stationary resilient clips for holding the said individual carriers in an operative position.

13. In the art of optical projection, a projecting device having supporting means and two projecting sections relatively adjustable thereon, a plurality of object carriers pivotally and slidably mounted on said supporting means whereby the carriers are adjustable along the supporting means to bring any individual carrier opposite the projecting position and to permit the individual carrier to be then rotated into projecting position in the line of projection of the device, and a clip for holding each carrier in projecting position.

14. In the art of optical projection, a projecting device, a plurality of individual plate carriers, means mounting said carriers to enable the movement of said carriers individually into the line of projection of the device in any desired order of sequence, and a stationary spring clip for engaging and holding each carrier in projecting position within the line of projection of the device when said carrier is moved into said position.

In witness whereof, I hereunto subscribe my signature.

BURNHAM W. KING.